US005165188A

United States Patent [19]
Tsiros

[11] Patent Number: 5,165,188
[45] Date of Patent: Nov. 24, 1992

[54] ADJUSTABLE WINDOW TINTING APPARATUS

[76] Inventor: George N. Tsiros, 143 Westwood Rd., Asheville, N.C. 28804

[21] Appl. No.: 818,249

[22] Filed: Jan. 8, 1992

[51] Int. Cl.⁵ ............................................. E05B 65/04
[52] U.S. Cl. ............................................ 49/63; 49/62; 49/349; 296/146 J; 296/97.7
[58] Field of Search .............. 49/63, 62, 61, 349, 49/362; 296/146 J, 97.7, 95.1

[56] References Cited

U.S. PATENT DOCUMENTS

| | | | |
|---|---|---|---|
| 2,698,753 | 1/1955 | Kellman et al. | 49/349 |
| 2,780,458 | 2/1957 | Thaxton | 49/63 |
| 3,868,293 | 2/1975 | Selph | 296/97.7 X |
| 4,331,359 | 5/1982 | Sheldon | 49/63 X |
| 4,409,758 | 10/1983 | Dickerson et al. | 49/62 X |
| 4,592,180 | 6/1986 | Gerritsen | 49/62 X |
| 4,653,797 | 3/1987 | Tran | 49/62 X |
| 4,930,255 | 6/1990 | Sea | 49/63 |
| 4,943,103 | 7/1990 | Rosen | 296/97.7 X |

Primary Examiner—Philip C. Kannan
Attorney, Agent, or Firm—Leon Gilden

[57] ABSTRACT

A window tinting apparatus is arranged for adjustment relative to a vehicular door adjacent an existing window of the associated vehicle. A tinted plate is arranged for sliding orientation adjacent and coextensive with a vehicular window plate to provide for selective tinting of an associated door window, with the translucent tinted plate mounted within the door below the window opening in adjacency to the existing window plate of the vehicular door.

2 Claims, 4 Drawing Sheets

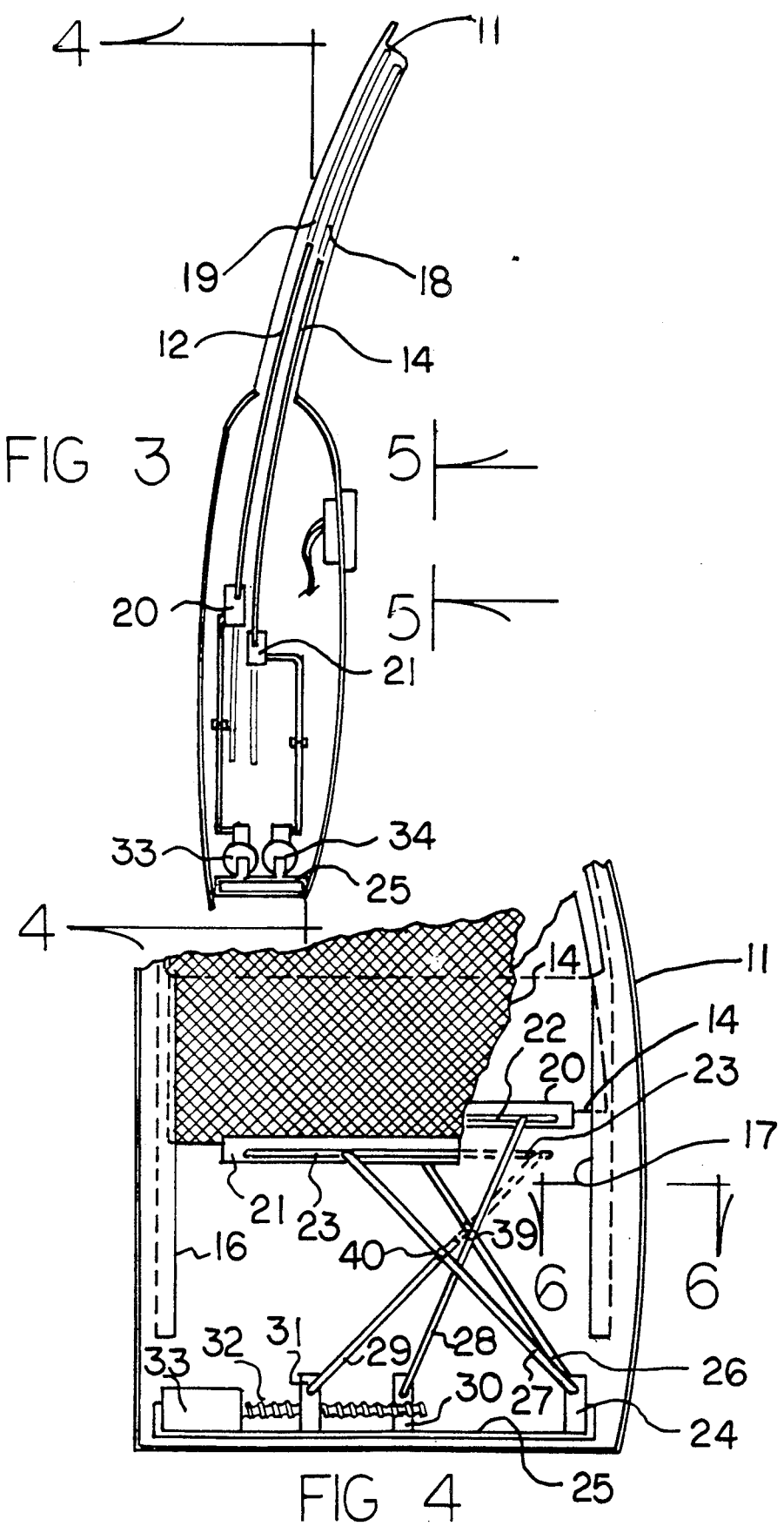

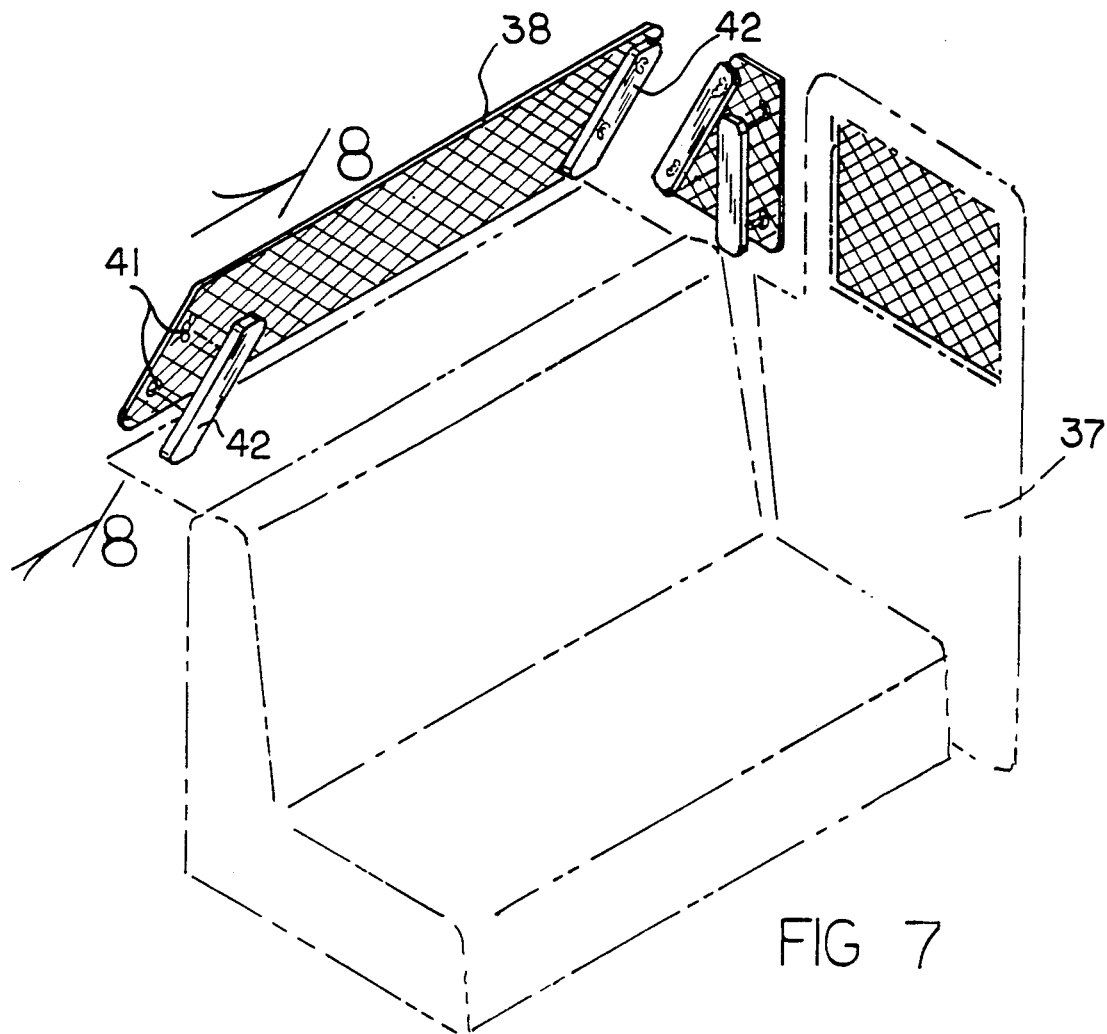
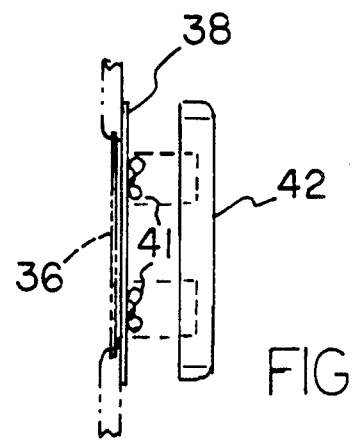

ADJUSTABLE WINDOW TINTING APPARATUS

BACKGROUND OF THE INVENTION

1. Field of the Invention

The field of invention relates to window tinting apparatus, and more particularly pertains to a new and improved adjustable window tinting apparatus wherein the same is arranged for the selective tinting of a window of an associated vehicle.

2. Description of the Prior Art

Tinting of vehicular windshields is of contemporary popularity to minimize glare within a passenger compartment of an associated self-propelled vehicle. Frequently, however, there are situations when tinting is not desirable, such as in cloudy day situations and evening driving conditions. To this end, the instant invention attempts to overcome deficiencies of the prior art by providing adjustment of available tinting relative to an associated window of a self-propelled vehicle. Prior art window devices for the driving and control of windows is exemplified in the U.S. Pat. No. 4,808,894 to Mizuta setting forth a power window device.

U.S. Pat. No. 4,389,818 to Sakamoto sets forth a position for a power operated automobile window glass regulating mechanism.

U.S. Pat. No. 4,553,656 to Lense sets forth a power actuated drive mechanism for a window structure.

U.S. Pat. No. 4,905,413 to Kuki, et al. sets forth a further example of a power window drive mechanism.

As such, it may be appreciated that there continues to be a need for a new and improved adjustable window tinting apparatus as set forth by the instant invention which addresses both the problems of ease of use as well as effectiveness in construction utilizing dual power drives for an existing vehicular window plate and an adjacent translucent tinted window plate and in this respect, the present invention substantially fulfills this need.

SUMMARY OF THE INVENTION

In view of the foregoing disadvantages inherent in the known types of vehicular window apparatus now present in the prior art, the present invention provides an adjustable window tinting apparatus wherein the same is arranged to effect selective positioning of a translucent tinted window portion relative to a transparent window portion of a self-propelled vehicle. As such, the general purpose of the present invention, which will be described subsequently in greater detail, is to provide a new and improved adjustable window tinting apparatus which has all the advantages of the prior art power window apparatus and none of the disadvantages.

To attain this, the present invention provides a window tinting apparatus arranged for adjustment relative to a vehicular door adjacent an existing window of the associated vehicle. A tinted plate is arranged for sliding orientation adjacent and coextensive with a vehicular window plate to provide for selective tinting of an associated door window, with the translucent tinted plate mounted within the door below the window opening in adjacency to the existing window plate of the vehicular door.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved adjustable window tinting apparatus which has all the advantages of the prior art power window apparatus and none of the disadvantages.

It is another object of the present invention to provide a new and improved adjustable window tinting apparatus which may be easily and efficiently manufactured and marketed.

It is a further object of the present invention to provide a new and improved adjustable window tinting apparatus which is of a durable and reliable construction.

An even further object of the present invention is to provide a new and improved adjustable window tinting apparatus which is susceptible of a low cost of manufacture with regard to both materials and labor, and which accordingly is then susceptible of low prices of sale to the consuming public, thereby making such adjustable window tinting apparatus economically available to the buying public.

Still yet another object of the present invention is to provide a new and improved adjustable tinting window tinting apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic cross-sectional illustration, taken along the lines 3—3 of FIG. 1 in the direction indicated by the arrows.

FIG. 4 is an orthographic view, taken along the lines 4—4 of FIG. 3 in the direction indicated by the arrows.

FIG. 7 is an isometric illustration of a rear passenger compartment of a self-propelled vehicle mounting translucent panels therewithin.

FIG. 8 is an orthographic view, taken along the lines 8—8 of FIG. 7 in the direction indicated by the arrows.

DESCRIPTION OF THE PREFERRED EMBODIMENT

Figure 1:
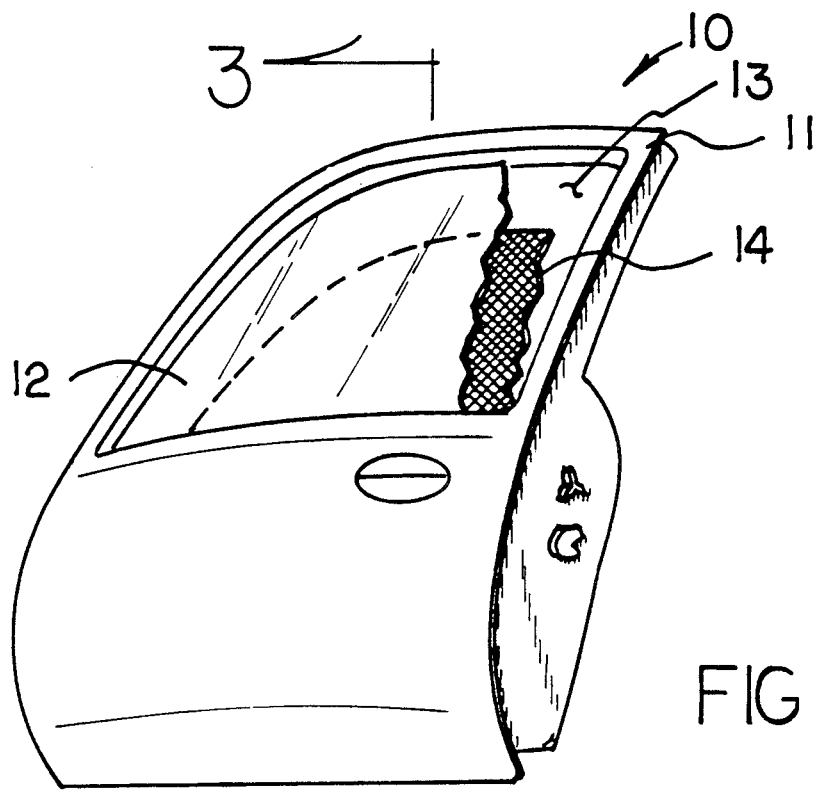
FIG. 1 is an isometric illustration of a door of an associated vehicle mounting the invention therewithin.

With reference now to the drawings, and in particular to FIGS. 1 to 8 thereof, a new and improved adjustable window tinting apparatus embodying the principles and concepts of the present invention and generally designated by the reference numeral 10 will be described.

Figure 2:
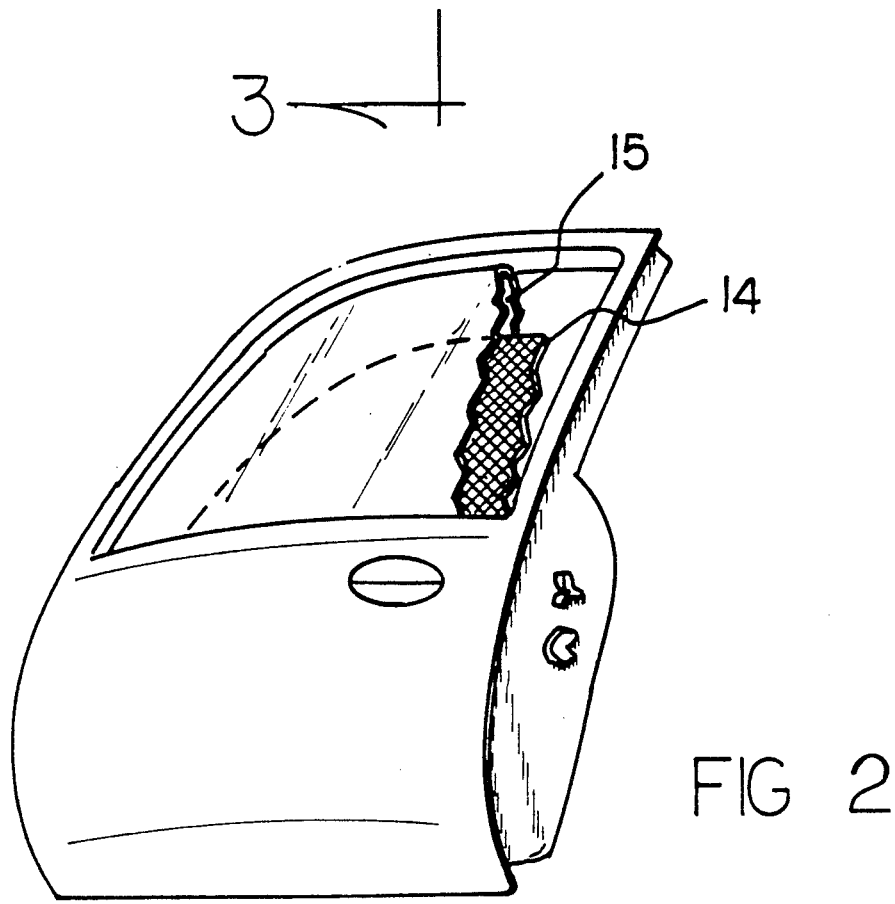
FIG. 2 is isometric illustration of the door structure positioning the translucent window tinting plate within a window cavity of a self-propelled vehicle.

More specifically, the adjustable window tinting apparatus 10 of the instant invention essentially comprises cooperation with a vehicular door 11 that includes a window plate 12 of transparent construction vertically adjustable within a window opening 13 of the door 11. A translucent tinted plate 14, as illustrated in FIG. 1, is vertically adjustable within the window opening adjacent to a rear surface of the transparent window plate 12. The FIG. 2 illustrates the use of a window cavity 15 formed by the window plate 12 receiving a translucent window plate 14 therewithin as a modified manner of orienting the translucent window plate relative to the transparent window plate.

Figure 5:
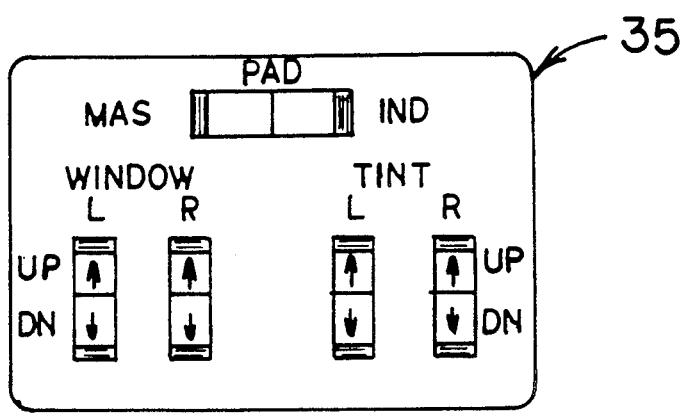
FIG. 5 is an orthographic view, taken along the lines 5—5 of FIG. 3 in the direction indicated by the arrows.
Figure 6:
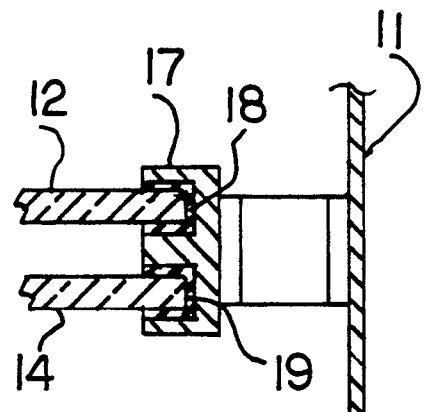
FIG. 6 is an orthographic view taken along the lines 6—6 of FIG. 4 in the direction indicated by the arrows.

FIG. 3 and FIG. 4 illustrate the use of respective first and second window guides 16 and 17 mounted to adjacent sides of the door 11 extending adjacent a floor of the door therealong to an upper distal end of the door. Each of the first and second window guides 16 and 17 includes respective coextensive tracks defined by a first and second track 18 and 19, wherein the first tracks 19 receive the transparent window 12 slidably therewithin, with the second tracks 18 receiving the translucent tinted window plate 14 therewithin. First support channel 20 is spaced from and parallel a second support channel 21, wherein the first support channel 20 receives a lower edge of the window plate 12 therewithin, and the second support channel 21 receives a lower edge of the translucent tinted plate 14 therewithin. The first and second support channels 20 and 21 are arranged for reciprocation relative to a floor of the door 11. The first channel 20 includes a first slot 22 directed therethrough below the window plate 12, with the second channel 21 including a second slot 23 directed therethrough below a lower edge of the translucent window plate 14. The floor of the door 11 includes a mounting plate 25 mounted thereto, with a support block 24 fixedly mounted to a forward end of the mounting plate 25. The support block 24 pivotally mounts on opposed sides thereof respective first and second pivot legs 26 and 27 received within the respective first and second slots 22 and 23. First and second drive motors 33 and 34 are arranged for effecting reciprocation of the window plate and the tinted window plate 14, with the first drive motor 33 including a first worm screw (not shown) of identical construction as that of a second worm screw 32 rotatably mounted relative to a second drive motor 34, as illustrated in FIG. 4. The second worm screws include respective first and second drive blocks 30 and 31 reciprocatably mounted along the respective first and second worm screws in a parallel sliding relationship relative to the mounting plate 25. The first drive block 30 includes a third pivot leg 28 pivotally mounted thereto extending into the first slot 20 and including a first axle 39 pivotally mounting the first pivot leg relative to the third pivot leg to effect a scissor-like action to effect raising and lowering of the transparent window plate 12 upon reciprocation of the first drive block 30 along its associated first worm screw. The second worm screw 32 includes a second drive block pivotally mounting a lower distal end of a fourth pivot leg extending into the second slot at its upper distal end and pivotally mounted to the second pivot leg 27 about a second axle 40. In this manner, selective actuation of the first and second drive motors effect selective reciprocation of the respective window plate 12 and the tinted window plate 14 relative to the window opening 13 as the drive mechanism is mounted within a door cavity positioned below the window opening 13, in a manner as illustrated in the FIGS. 3 and 4. A typical drive control, as illustrated in FIG. 5, includes a drive control circuit of any conventional direct current configuration which may be utilized and such is exemplified in the U.S. Pat. No. 4,808,894 incorporated herein by reference. The control pad 35 is arranged for mounting to an interior surface of the door, as illustrated in the FIG. 3.

The FIGS. 7 and 8 illustrate further tinted window plates to include vehicular translucent tinted rear panel 38 positioned adjacent an interior surface of a vehicular rear window 36, as illustrated in FIG. 8. Fasteners 42 are arranged for mounting within the associated rear window 36, or alternatively to adjacent portions of the vehicular body, to receive the tinted rear panel 38 utilizing wing nut fasteners and the like for fixedly securing the tinted rear panel 38 adjacent to the rear window 36. Either snap-on or magnetic fastener covers 42 including cavities to receive the wing nuts are arranged for securement to effect covering of the fasteners minimizing their distraction within a vehicular environment. Such construction may be similarly afforded to side windows, as illustrated in FIG. 7. The rear door 37 is arranged for utilizing the invention, as illustrated in the FIG. 1 for example.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Futher, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable window tinting apparatus, comprising in combination,
   a vehicular door, the vehicular door including a window opening directed through the door, and
   a door cavity positioned within the door below the window opening, and
   a transparent window plate reciprocatably mounted within the window opening, and
   a translucent tinted plate positioned within the window opening reciprocatably mounted thereto adjacent a window plate, and
   first drive means for effecting reciprocation of the transparent window plate, and second drive means for effecting reciprocation of a translucent tinted plate, and
   the door includes a first window guide and a second window guide, wherein the first window guide and the second window guide are arranged on opposed sides of the door and on opposed sides of the window opening, wherein the first guide includes a first track and a second track, and the second window guide includes a further first track and a further second track, wherein the first track and the second track are arranged in a parallel coextensive relationship, and the further first track and the further second track are arranged in a parallel coextensive relationship, and the transparent window plate is slidably received within the first track and the further first track, and the translucent tinted plate is slidably received within the second track and the further second track, and
   a first support channel and a second support channel contained within the door cavity, wherein the first support channel and the second support channel are in a parallel spaced relationship, and the first support channel mounts the transparent window plate and the second support channel mounts the translucent tinted plate, the first support channel includes a first slot and the second support channel includes a second slot, and the door including a door floor positioned at a lower portion of the door cavity, wherein the door floor includes a mounting plate, the mounting plate including a support block fixedly mounted to the mounting plate adjacent the second window guide and the support block includes a first pivot leg and a second pivot leg pivotally mounted on opposed sides of the support block, and the first pivot leg and the second pivot leg are received within the respective first slot and the second slot respectively spaced from the support block, and a first drive motor and a second drive motor mounted to the mounting plate adjacent the first window guide, wherein the first drive motor includes a first worm screw and the second drive motor includes a second worm screw, the first worm screw includes a first drive block and the second worm screw includes a second drive block, and a third pivot leg pivotally mounted to the first drive block and received within the first slot and a fourth pivot leg pivotally mounted to the second drive block and received within the second slot, wherein the first pivot leg and the third pivot leg are pivotally mounted relative to one another, including a first axle pivotally securing the first pivot leg and the third pivot leg together, and the second pivot leg and a fourth leg are pivotally mounted together utilizing a second axle directed through the second pivot leg and the fourth pivot leg pivotally mounting the second pivot leg and the fourth pivot leg together, and the first pivot leg, the second pivot leg, the third pivot leg, and the fourth pivot leg are each contained within the door cavity.

2. An apparatus as set forth in claim 1, wherein the vehicular door is mounted within a vehicle, and the vehicle includes a rear passenger compartment, and the rear passenger compartment includes a rear window, the rear window is formed of a transparent material and further including a translucent tinted rear panel arranged for securement adjacent an interior surface of the rear window, and a plurality of ferrous fastening members mounted relative to the rear window to arrange for securement of the tinted rear panel relative to the rear window, and at least one magnetic fastener cover arranged for magnetic adherence to the fasteners to effect covering of the fasteners when the tinted rear panel is mounted adjacent the rear window.

* * * * *